ically comprises first and second pairs of resilient wings provided on opposite sides of the housing. Each pair of wings comprises a resilient stop wing and a deflectable snap-in wing projecting through an aperture provided in the stop wing. The stop wing provides bearing surfaces for resiliently bearing against the entry side of a panel and the snap-in wing has a locking lip with bearing surfaces for resiliently bearing against the opposite side of the panel after being passed through a panel opening by inward deflection of the snap-in wing. The improved releasable contact construction provides for unusually reliable and rugged retention of a contact in its receiving cavity by the combined action of a deflectable retention tine provided on the contact operating on the principle of long beam deflection with respect to a retention shoulder in the cavity along with two additionally provided radially compressible retention flares operating on the principle of radial compression with respect to the same retention shoulder.

United States Patent [19]

Mathe

[11] 3,998,518
[45] Dec. 21, 1976

[54] ELECTRICAL CONNECTOR HAVING IMPROVED RELEASABLE CONTACT CONSTRUCTION

[75] Inventor: Istvan Mathe, Cicero, Ill.

[73] Assignee: Bunker Ramo Corporation, Oak Brook, Ill.

[22] Filed: Feb. 28, 1975

[21] Appl. No.: 553,999

Related U.S. Application Data

[60] Continuation of Ser. No. 414,046, Nov. 8, 1973, abandoned, which is a division of Ser. No. 241,014, April 4, 1972, Pat. No. 3,790,923.

[52] U.S. Cl. .......................... 339/217 S; 339/221 R
[51] Int. Cl.² ..................................... H01R 13/42
[58] Field of Search ............... 339/217 S, 256, 258, 339/91 R, 211, 221

[56] References Cited

UNITED STATES PATENTS

| | | | |
|---|---|---|---|
| 2,463,826 | 3/1949 | Thacker | 339/258 R |
| 2,677,116 | 4/1954 | Ritter | 339/217 S |
| 2,877,441 | 3/1959 | Narozny | 339/217 S |
| 3,026,496 | 3/1962 | Gluck | 339/217 S |
| 3,178,673 | 4/1965 | Krehbiel | 339/217 S |
| 3,289,145 | 11/1966 | Ruehlemann et al. | 339/91 R |
| 3,320,574 | 5/1967 | Tuchel | 339/258 R |
| 3,566,342 | 2/1971 | Schmitt et al. | 339/217 S |
| 3,613,052 | 10/1971 | Maltais | 339/217 S |
| 3,614,706 | 10/1971 | Kukla | 339/14 R |

Primary Examiner—Roy Lake
Assistant Examiner—Neil Abrams
Attorney, Agent, or Firm—William Lohff; F. M. Arbuckle

[57] ABSTRACT

An electrical connector having improved panel mounting means and an improved releasable contact construction. The improved panel mounting means typi- 10 Claims, 7 Drawing Figures

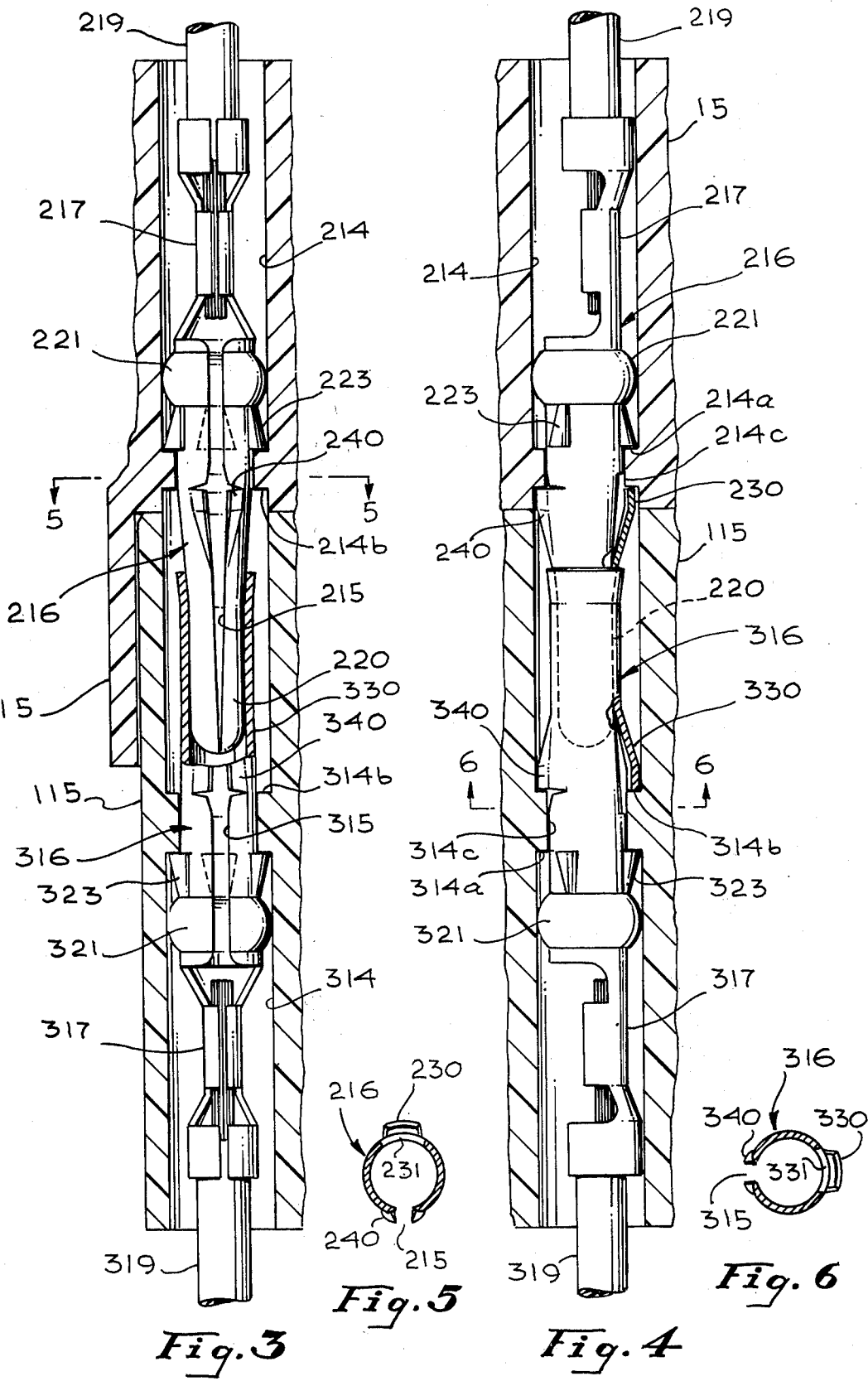

ELECTRICAL CONNECTOR HAVING IMPROVED RELEASABLE CONTACT CONSTRUCTION

This is a continuation application of application Ser. No. 414,046, filed Nov. 8, 1973, and now abandoned which was a division of application Ser. No. 241,014 filed Apr. 4, 1972 now U.S. Pat. No. 3,790,923.

The present invention relates generally to an improved panel-mountable housing.

The present invention is more particularly directed to providing improved mounting and contact constructions for electrical connectors.

A broad object of the invention is to provide a housing containing improved panel mounting means.

More specific objects of the invention are to provide electrical connector means which can rapidly and firmly be manually mounted in panels having widely differing thicknesses without requiring mounting or mechanical fasteners or the like, and also without requiring the provision of any special cut-outs or receiving means in the panel.

Another object of the invention is to provide improved electrical connector means which can be readily removed manually from the same side of the panel as used for mounting without the need for tools.

A further object of the invention is to provide improved electrical connector means having panel mounting means provided as an intergral part thereof.

A still further object of the invention is to provide connector means having improved panel mounting means which are rugged and durable and which are also resistent to overstressing.

Another broad object of the invention is to provide electrical connector means having an improved construction and arrangement for its internal contacts.

A more specific object of the invention in accordance with the foregoing object is to provide electrical connector means having removable contacts with improved contact retention features.

A further object of the invention is to provide electrical connector means containing improved stabilizing means for maintaining a contact in proper alignment.

In an exemplary embodiment of the invention, opposite sides of an electrical connector housing are each provided with a pair of resilient opposing wings projecting therefrom having oppositely acting panel bearing surfaces and constructed and arranged for cooperative interaction so as to permit the housing to be rapidly and securely mounted in or removed from a conventional opening of a panel having a wide range of possible thicknesses without the need for any mechanical fasteners or tools or the like.

In a particular preferred embodiment of the invention, each pair of opposing wings comprises a resilient stop wing and a deflectable snap-in wing projecting angularly from the housing towards one another with the snap-in wing being deflectable and projecting through an opening or aperture provided in the stop wing. In mounting the housing to the panel, the snap-in wings are the first to encounter the entry side of the panel which causes them to deflect inwardly to permit passage of locking lips provided on each snap-in wing through the panel opening. After the locking lips pass through the panel opening, the snap-in wings swing back to cause the locking lips provided to resiliently lock the housing in the panel between the snap-in and stop wings. The stop wing resiliency permits a wide range of panel thicknesses to be accommodated. The connector housing is also provided with a positive stop corresponding to maximum panel thickness in order to prevent overstressing.

In an exemplary embodiment of a releasable electrical connector contact construction in accordance with the invention, an improved releasable retention arrangement is achieved by the provision of a specially shaped deflectable retention tine on the contact operating in conjunction with the two radially compressible retention flanges or flares also provided on the contact. The deflectable tine operates on the principle of long beam deflection while the retention flanges or flares operate on the principle of radial compression, resulting in a highly reliable and rugged releasable contact construction. The contact is additionally provided with a plurality of keylike embossments which serve to provide a positive multi-point stop for contact insertion as well as to aid in pre-aligning the contact in proper position in the contact housing. Also provided is a stabilizer collar having a slight press fit in the housing which serves to maintain the contact securely aligned after insertion.

The specific nature of the invention as well as other objects, features, advantages and uses thereof will become evident from the following detailed description of an exemplary embodiment taken in conjunction with the accompanying drawings in which:

FIGS. 3 and 4 are front and side longitudinal cross-sectional views illustrating the construction and mating of an engaged pair of electrical connector pin and socket contacts in accordance with the invention.

FIGS. 5 and 6 are cross-sectional views taken along the lines 5—5 and 6—6 in FIGS. 3 and 4 illustrating further details of the retentior tines and flares provided on each contact in accordance with the invention.

Like characters designate like elements throughout the flares of the drawings.

Figure 1:
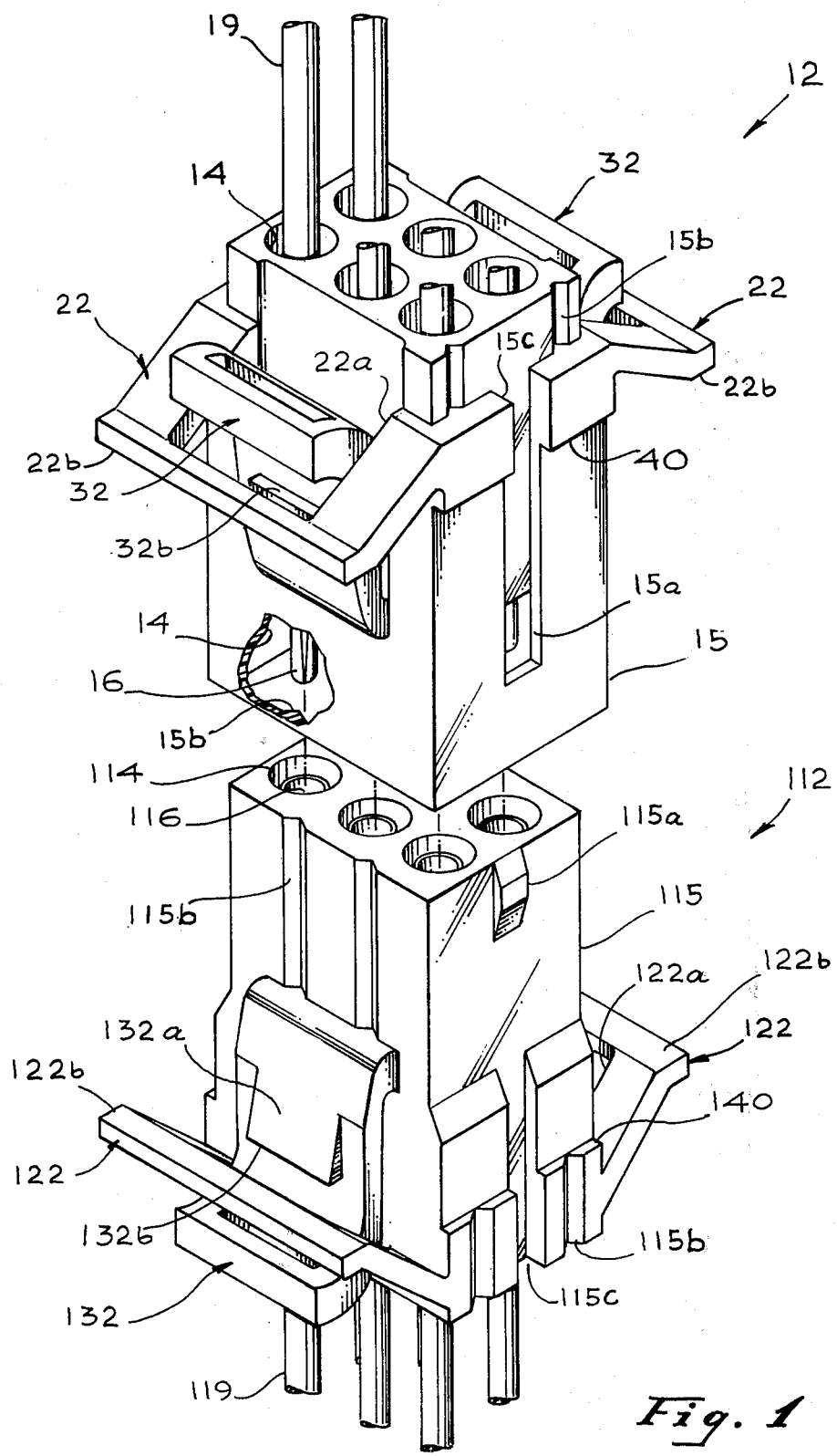
FIG. 1 is a perspective view of an electrical connector assembly comprised of mating socket and pin connector parts in accordance with the invention.
Figure 2A:
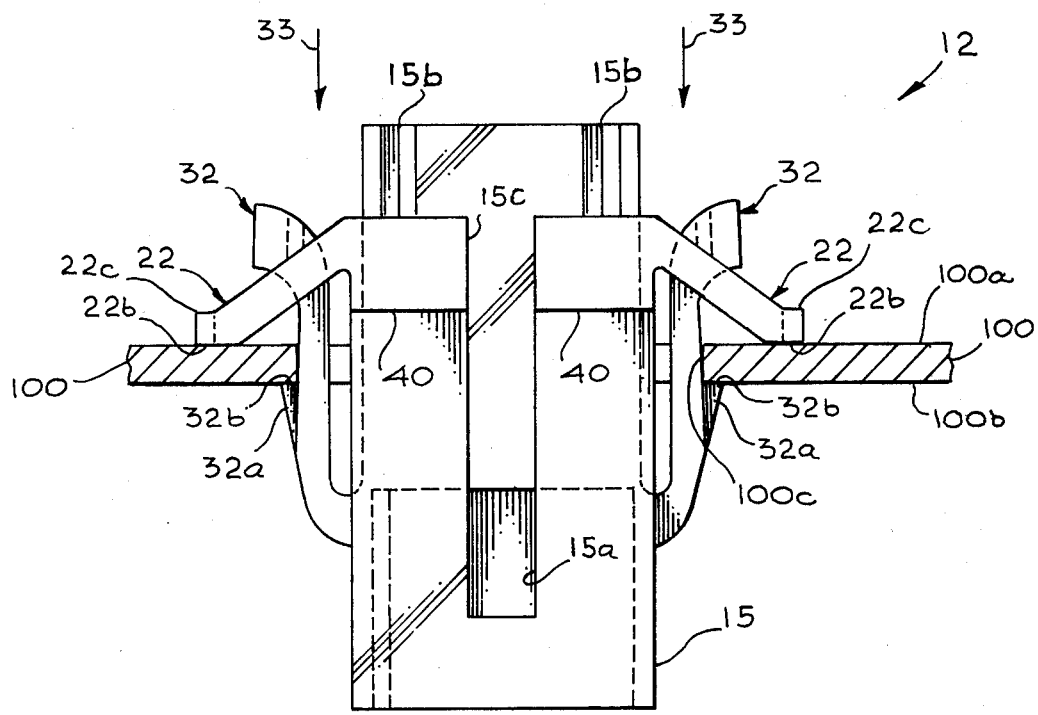
FIGS. 2a and 2b are side views of the pin and socket connector parts of FIG. 1 additionally illustrating how each may be mounted in a panel in accordance with the invention.
Figure 2B:
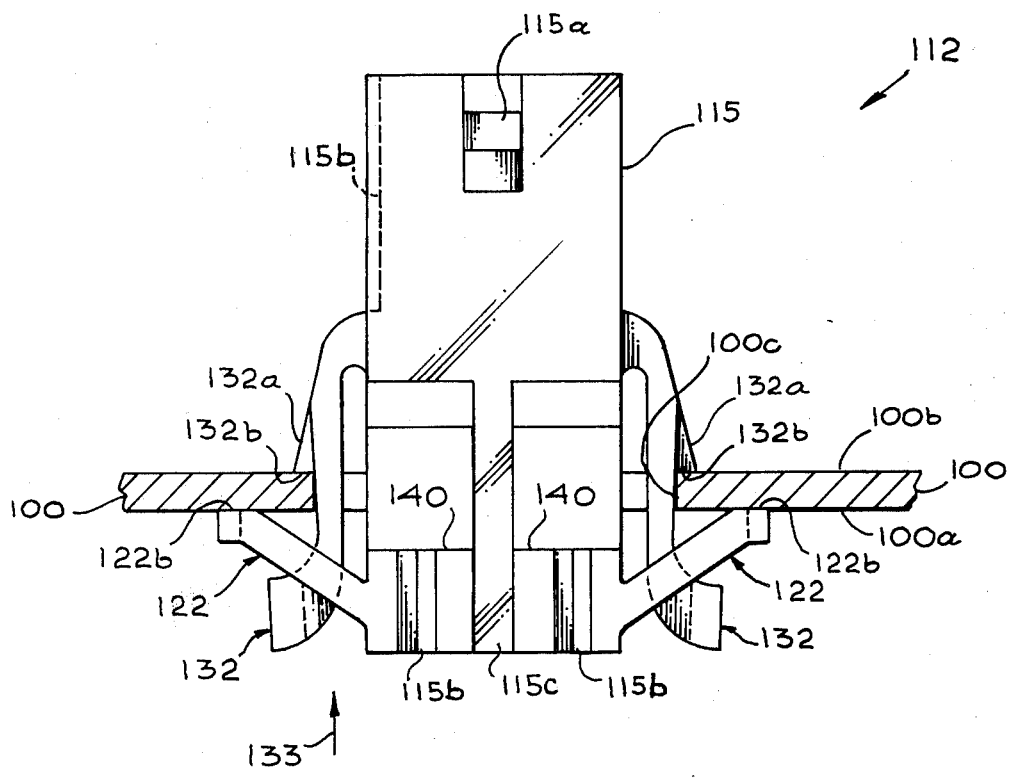

To facilitate an understanding of the connector assembly illustrated in FIGS. 1 and 2, elements of the pin connector part 12 are designated by numbers less than 100, while elements of the socket connector part 112 are designated by numbers between 100 and 200, and the panel illustrated in FIG. 2 is designated by the number 100. The mating pin and contact constructions illustrated in FIGS. 3–6 are given designations such that elements associated with the pin contact 212 are designated by numbers between 200 and 300, while elements associated with the socket contact 312 are designated by numbers between 300 and 400. Also, where appropriate and helpful to the description, sub-portions of a larger element in the drawings are designated by the numeral of the larger element followed by the letter a, b, c, etc. To further aid a ready understanding of the invention, mating or similar functioning parts on different elements are usually designated by numbers differing exactly by 100.

It is additionally to be noted that the present invention is primarily directed to the provision of improved mounting means on electrical connectors and to an improved releasable contact construction, and that other connector portions may be conventional. Accordingly, such conventional portions are referred to only briefly and generally in the description, since they may readily to provided by those skilled in the art.

First to be considered with reference to FIGS. 1 and 2 is an exemplary embodiment of panel mounting means which may be provided for a connector assembly in accordance with the invention. As shown, the connector assembly comprises a pin connector part 12 and a mating socket part 112. Either or both of the pin connector and socket connector parts 12 and 112 may be provided with panel mounting means in accordance with the invention so as to permit either one to be mounted in a panel 100 as shown in FIG. 2.

The pin connector part 12 may typically comprise a generally rectangular-shaped housing 15 of insulating material having a plurality of pin receiving cavities 14 (FIG. 1) extending axially therethrough containing pins 16 suitably mounted therein and attached to respective wires 19. Similarly, the mating socket connector part 112 may typically comprise a generally rectangular-shaped housing 115 having socket receiving cavities 114 therein extending axially therethrough containing sockets 116 suitably mounted therein and attached to respective wires 119.

In order to provide for the interconnection and locking together of the pin and socket connectors 12 and 112, an interlock slot 15a is provided on a side of the pin housing 15 for cooperative locking engagement with a dimple 115a provided on a corresponding side of the socket housing 115. Also, the housing 15 and 115 may additionally include notches and/or keyways such as indicated at 15b and 115b for orienting and polarizing purposes. Additional notches 15c and 115c are provided for use during molding.

Each of the pin and socket connector parts 12 and 112 are provided with panel mounting means in accordance with the invention which may be the same on both. Accordingly, only the mounting means provided for the pin connector part 12 will be specifically referred to in the description following, it being understood that the mounting means provided for the socket connector part 112 may be of similar construction with like elements thereof having a numerical designation exactly 100 greater than those used for the pin connector part 12.

As illustrated in the upper portions of FIGS. 1 and 2, the panel mounting means provided on the connector part 12 basically comprise a pair of opposing resilient wings 22 and 32 provided on opposite sidewalls of the housing 15, and which may typically be formed of pre-set semi-rigid thermoplastic material. As will become evident, the wings 22 and 32 of each pair project angularly from the housing 15 towards one another with the snap-in wing 32 projecting through a centrally located aperture 22a (FIG. 2) provided in the stop wing 22.

Each of the stop wings 22 is provided with bearing surfaces 22b for resiliently bearing against the entry side 100a of the panel 100 (FIG. 2) when the connector part 12 is mounted therein, the direction of insertion being indicated by the arrows 33. These stop wing bearing surfaces 22b are provided on a lateral bar portion 22c extending parallel to and spaced from the sidewall of the housing 15. The snap-in wing bearing surfaces 32b are provided on a tapered locking lip 32a (as best indicated at 132a in the lower half of FIG. 1) for resiliently bearing against the outward side 100 b of the panel 100 after insertion. The construction, arrangement and operation of the stop and snap-in wings 22 and 32 are such that, during insertion of the connector part 12 in the panel 100, the snap-in wings 32 first encounter the panel which causes them to deflect inwardly so as to permit passage of the locking lips 32a of the snap-in wings 32 through the panel opening 100c. After passing through the panel opening 100c, the snap-in wings 32 swing back to cause the locking lips 32a to resiliently lock the connector part 12 in the panel 100 between the stop wing and snap-in wing bearing surfaces 22b and 32b as shown in FIG. 2.

In order to prevent overstressing, the connector housing 15 is preferably additionally provided with shoulders 40 which abut against the entry side 100a of the panel 100 so as to provide a positive stop for an inserted connector part at a position corresponding to the maximum panel thickness which the wings are designed to accommodate. It will be understood that a wide range of panel thicknesses may be accommodated by providing the stop an snap-in wings 22 and 32 with the appropriate resiliency.

It is to be noted that the above-described construction and arrangement of exemplary mounting means in accordance with the invention provides the very significant advantages of permitting the stop wing panel bearing surfaces 22b to be provided extending the entire length of the snap-in wing bearing surfaces 32b as well as extending beyond both outer edges thereof in a direction parallel to the panel and lateral to the housing, while also permitting the stop wing bearing surfaces 22b to be provided at a position spaced from the housing sidewall which is large relative to that of the snap-in wing locking lip bearing surfaces 32b, and preferably is at least 50% greater. As a result, a housing having panel mounting means in accordance with the invention can be most firmly and securely mounted in a panel having a wide range of possible thicknesses, while also being rapidly insertable and removable without the need for any tools or mechanical fasteners or the like.

It will be understood that the above-described exemplary mounting means in accordance with the invention also provides the additional advantage of not requiring that the panel 100 have a specially shaped or complementary opening. Thus, a housing having panel mounting means in accordance with the invention may readily be employed with an existing panel opening. It will further be understood that a housing may conveniently and rapidly be removed from the panel merely by manually depressing the free ends of the snap-in wings 32 inwardly so as to permit passage of the snap wing locking lips 32a back through the panel opening 100c.

Next to be considered with reference 3–6 is an exemplary embodiment of a releasable electrical connector contact construction in accordance with the invention which may advantageously be employed in providing the pin and socket terminals 16 and 116 generally illustrated in FIG. 1. FIGS, 3 and 4 are front and side cross-sectional views illustrating a pin contact 216 in mating engagement with a socket contact 316.

Each of the contacts 216 and 316 may typically be provided in a generally cylindrical shape with respective longitudinal slots 215 and 315 by appropriately shaping a sheet metal blank having suitable electrical and mechanical properties. It will be noted that, except for the mating pin and socket portions 200 and 300 (which may be of conventional construction), the remaining portions of the pin and socket contacts 216 and 316 may typically have essentially the same construction.

The description to follow will accordingly specifically refer only to the pin contact 216, it being understood that the socket contact 316 is similarly constructed with like elements thereof having a number exactly 100 greater than that used for the pin socket 216.

It will be seen in FIGS. 3 and 4 that the pin contact 216 includes a ferrule 217 for providing a crimping attachment to a wire 219. Forwardly of the ferrule 217, the contact 216 is provided with a resilient collar 221 having a slight press fit with respect to the cavity 214 so as to permit its serving as a stabilizer to maintain the contact securely aligned after insertion. Immediately ahead of the collar 221 are keylike embossments 223 which contact an annular shoulder 214a in the cavity 214 and to provide a positive multi-point stop for an inserted contact. This multi-point stop additionally serves to pre-align the contact in proper position.

Further forward of the embossments 223 (and as best shown in FIGS. 4 and 5), the contact 216 is provided with releasable retention means cooperating with a common annular retention shoulder 214b. These releasable retention means comprise a cantilever spring leg or deflectable retention tine 230 provided on one side of the contact, for flexure about an axis transverse to the elongate or longitudinal axis of the contact or slot and two outwardly projecting retention flares or flanges 240 provided on the opposite side of the contact and on opposite sides of the slot 215 (FIG. 5) with the flanges or flares extending along the edge of or parallel to the slot and presenting a transverse edge extending radially from the contact axis and to the slot for alignment with the radial face of the shoulder of the cavity, which edge and flares are relatively rigid to forces acting along the longitudinal axis of the contact and the edge is generally coincident with the free end of the leg 230. The deflectable tine 230 is deflectable into an appropriate opening 231 (FIG. 5) provided in the contact 216 and operates on the principle of long beam deflection. When the contact 216 is inserted from the rear (that is, from the upper end as seen in FIGS. 3 and 4), the retention tine 230 deflects to pass through the smallest diameter portion of the cavity 214, which is constituted by the bore 214c of the cavity 214 located between the oppositely facing shoulders 214a and 214b. After passing through the bore 214c, the retention tine 230 swings back to abut the retention shoulder 214b and thereby retain the contact 216 in the cavity 214.

The retention flares 240, on the other hand, operate on the principle of radial compression by flexing along a position extending axially of the contact. Accordingly, when the contact 216 is inserted from the rear, the contact body is radially compressed by the bore 214c to permit passage of the flares 240 therethrough. After the flares 240 pass through the bore 214c, the contact body relaxes to cause the flares 240 to abut the retention shoulder 214b along with the deflectable retention tine 230 which, of course, biases the flares to hold them under the bore shoulder. An unusually reliable and rugged retention of the contact in its cavity is thereby achieved, In order to remove the contact 216, a readily providable appropriate hand tool may be employed to inwardly deflect the retention tine 230 while at the same time radially compressing the contact body so as to disengage both the retention tine 230 and the flares 240 from the retention shoulder 214b, thereby permitting the contact to be withdrawn. In this regard, it is most advantageous that the end portion of the retention tine 230 be shaped, as shown in FIG. 4, to be generally parallel to the longitudinal axis of the contact. This permits the hand tool to provide sufficient inward deflection of the retention tine 230 on flexure about a position extending transverse to the contact axis for release thereof without the end of the tool having to be inserted to a position where it reaches the end of the retention tine 230 and the retention flares 240. Thus, the tool can provide for release of the retention tine 230 at a position spaced from the end of the tine 230 engaged with the shoulder formed by the reduced diameter portion or bore 214c and accommodate the flares 240.

Although the invention has been described herein with respect to particular exemplary embodiments, it is to be understood that the invention is subject to a wide range of possible modifications in construction, arrangement and/or use without departing from the scope of the invention as defined in the appended claims.

The embodiments of the invention in which an exclusive property or privilege is claimed are defined as follows:

1. An electrical connector part comprising:
   a housing having at least one contact receiving cavity therein providing inner surfaces of insulating material,
   a first electrical contact defined by an annular wall having a longitudinal axis and an elongate slot therein extending parallel to the longitudinal axis of said contact and disposed in said cavity for engagement with another contact moved along said axis,
   first releasable retention means provided on said contact at a position spaced circumferentially from said slot and having a free end spaced radially outwardly of said contact operating on the principle of long beam deflection by flexure about a flexure axis transverse to said slot,
   radially compressible second releasable retention means on said contact extending parallel to and flared outwardly from said slot and having a transverse edge extending radially outwardly of said wall and transversely to said wall, and
   shoulder means and a radial face provided in said cavity, said shoulder means engaging said first retention means for flexing the free end thereof inwardly toward said longitudinal axis of said contact and engaging and radially compressing said second retention means to permit insertion of said first contact and each retention means in one direction past said shoulder means, whereafter the free end flexes outwardly to engage a surface of said cavity to bias said first contact transversely to the longitudinal axis of said first contact and the compressed second retention means relaxes to align said transverse edge to engage said radial face, said free end and said transverse edge engaging said radial face to thereafter retain said first contact in said cavity in response to a force created by engagement of said other contact with said first contact tending to move said first contact in a direction opposite said one direction, said first retention means thereafter flexibly operable at a position spaced from said free end and said second retention means compressibly operable to enable the displacement of said transverse edge from alignment with said radial face and movement of said first contact in said opposite direction from said cavity.

2. The part in claim 1, wherein said shoulder means is integrally formed on said housing in a complete circumferential surface for said cavity and said contact wall includes a resilient annularly shaped collar press-fit in said cavity and serving as a stabilizer to maintain said first contact securely aligned in said cavity after insertion thereof.

3. A part claimed in claim 2, wherein said first contact includes a plurality of spaced keylike embossments formed on said wall with each embossment having a surface extending radially outwardly of the axis of said annular wall and extending along said annular wall from said collar to engage with said shoulder means in said cavity so as to provide a multi-point stabilized stop for said first contact and also to pre-align said first contact in proper position.

4. The part claimed in claim 1, wherein said first retention means comprises an inwardly deflectable tine having an edge on said free end coincident with said transverse edge on said second retention means, and said second retention means comprises at least one radially compressible outwardly projecting flange extending from and partially defined by said slot.

5. The part claimed in claim 1, wherein said housing includes panel mounting means comprising first and second pairs of resilient wings provided on opposite sides of said housing, each pair of wings comprising a stop wing and a deflectable snap-in wing projecting from said housing towards one another and providing oppositely acting panel bearing surfaces for mounting of said housing in a panel opening.

6. The part claimed in claim 5, wherein each of said stop wings includes an aperture through which its corresponding snap-in wing projects, and wherein each snap-in wing is deflectable towards said housing to permit passage of its panel bearing surfaces through a panel for bearing against the opposite side of the panel after return of the snap-in wing to its undeflected position.

7. An electrical connector assembly comprising:
a housing having at least one contact receiving cavity therein with a longitudinal axis and an inner surface of insulating material:
a small diameter portion on said housing extending into said cavity to reduce the diameter of said cavity and define a radial face in said cavity;
a sheet metal electrical first contact having an annularly shaped first wall defining a longitudinal contact axis and including a slot in said wall extending parallel to said contact axis with said wall arranged for passage into said cavity and disposition in said cavity along the longitudinal axis of said cavity for electrical engagement with another contact moved along said axis:
radially compressible retention flange means on said first contact wall extending axially of said first contact wall along said slot and flared radially outwardly and transversely of said wall with said retention flange means having a transverse edge at one end extending in a radial direction both radially outwardly of said wall and transverse to said wall for passage in one direction with said first contact past said portion and radial face, said retention flange means compressed by said small diameter portion of said housing and relaxing after passage therethrough as said contact is moved in one direction through said cavity; and a cantilever spring leg on said contact wall spaced circumferentially from said slot and said radially compressible retention flange means with said leg having a free end spaced radially outwardly of said wall to flex radially inwardly toward said wall about a position extending transverse to said slot and the axis of said first contact for enabling the passage of said contact and retention flange means in said one direction past said small diameter portion and thereafter engaging one surface of said cavity for biasing said contact wall in a direction transverse to the axis of said first contact to align said free end and said transverse edge for engagement with said radial face to resist passage of said contact in the other direction past said portion in response to a force created by the engagement of said other contact with said first contact and whereafter the free end of said cantilever leg is adapted to be flexed radially inwardly toward the axis of said first contact and said retention flange means compressed radially for enabling the passage of said first contact including said transverse edge in the other direction past said portion and from said cavity.

8. An electrical connector part comprising:
a housing having at least one contact receiving cavity therein providing inner surfaces of insulating material,
a first electrical contact defined by an annular wall having a longitudinal axis and an elongate slot therein extending parallel to the longitudinal axis of said contract and disposed in said cavity for engagement with another contact moved along said axis,
first releasable retention means provided on said contact at a position spaced diametrically from said slot and having a free end spaced radially outwardly of and parallel to said contact and operating on the principle of long beam deflection by flexure about a flexure axis transverse to said slot,
radially compressible second releasable retention means on said contact extending parallel to and flared outwardly from said slot and having a transverse edge extending radially outwardly of said wall and transversely to said wall, and
shoulder means and a radial face provided in said cavity, said shoulder means engaging said first retention means for flexing the free end thereof inwardly toward said longitudinal axis of said contact and engaging and radially compressing said second retention means to permit insertion of said first contact and each retention means in one direction past said shoulder means, whereafter said free end flexes outwardly to engage a surface of said cavity to bias said first contact transversely to the longitudinal axis of said first contact and the compressed second retention means relaxes to align said transverse edge to engage said radial face, said free end and said transverse edge engaging said radial face to thereafter retain said first contact in said cavity in response to a force created by engagement of said other contact with said first contact tending to move said first contact in a direction opposite said one direction, said first retention means thereafter flexibly operable at a position spaced from said free end and said second retention means compressibly operable to enable the displacement of said transverse edge from alignment with said radial face and movement of said first contact in said opposite direction from said cavity.

9. An electrical connector part comprising:

a housing having at least one contact receiving cavity therein providing inner surfaces of insulating material, a first electrical contact defined by an annular wall having a longitudinal axis and an elongate slot therein extending parallel to the longitudinal axis of said contact and disposed in said cavity for engagement with another contact moved along said axis.

first releasable retention means provided on said contact at a position spaced circumferentially from said slot and having a free end spaced radially outwardly of and parallel to said contact and operating on the principle of long beam deflection by flexure about a flexure axis transverse to said slot, radially compressible second releasable retention means on said contact including ramp-shaped portions extending parallel to and flared outwardly from said slot and having transverse edges extending radially outwardly of said wall and transversely to said wall, and shoulder means and a radial face provided in said cavity, said shoulder means engaging said first retention means for flexing the free end thereof inwardly toward said longitudinal axis of said contact and engaging said ramp-shaped portions and radially compressing said second retention means to permit insertion of said first contact and each retention means in one direction past said shoulder means, whereafter the free end flexes outwardly to engage a surface of said cavity to bias said first contact transversely to the longitudinal axis of said first contact and the compressed second retention means relaxes to align said transverse edges to engage said radial face, said free end and said transverse edges engaging said radial face to thereafter retain said first contact in said cavity in response to a force created by engagement of said other contact with said first contact tending to move said first contact in a direction opposite said one direction, said first retention means thereafter flexibly operable at a position spaced from said free end and said second retention means compressibly operable to enable the displacement of said transverse edge from alignment with said radial face and movement of said first contact in said opposite direction from said cavity.

10. An electrical connector part comprising:

a housing having at least one contact receiving cavity therein providing inner surfaces of insulating material, a first electrical contact defined by an annular wall having a longitudinal axis and an elongate slot therein extending parallel to the longitudinal axis of said contact and disposed in said cavity for engagement with another contact moved along said axis, first releasable retention means provided on said contact at a position spaced diametrically from said slot and having a free end spaced radially outwardly of and parallel to said contact and operating on the principle of long beam deflection by flexure about a flexure axis transverse to said slot, radially compressible second releasable retention means on said contact including ramp-shaped portions extending parallel to and flared outwardly from opposite sides of said slot and having a transverse edge extending radially outwardly of said wall and transversely to said wall, and shoulder means and a radial face provided in said cavity, said shoulder means engaging said first retention means for flexing the free end thereof inwardly toward said longitudinal axis of said contact and engaging said ramp-shaped portions and radially compressing said second retention means to permit insertion of said first contact and each retention means in one direction past said shoulder means, whereafter the free end flexes outwardly to engage a surface of said cavity to bias said first contact transversely to the longitudinal axis of said first contact and the compressed second retention means relaxes to align said transverse edges to engage said radial face, said free end and said transverse edges engaging said radial face to thereafter retain said first contact in said cavity in response to a force created by engagement of said other contact with said first contact tending to move said first contact in a direction opposite said one direction, said first retention means thereafter flexibly operable at a position spaced from said free end and said second retention means compressibly operable to enable the displacement of said transverse edge from alignment with said radial face and movement of said first contact in said opposite direction from said cavity.

* * * * *